(12) United States Patent  
Wellington et al.

(10) Patent No.: US 10,726,280 B2  
(45) Date of Patent: *Jul. 28, 2020

(54) TRAFFIC SIGNAL ANALYSIS SYSTEM

(71) Applicant: UATC, LLC, San Francisco, CA (US)

(72) Inventors: Carl Wellington, Pittsburgh, PA (US); Colin Green, Pittsburgh, PA (US); Adam Milstein, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/926,211

(22) Filed: Mar. 20, 2018

(65) Prior Publication Data

US 2018/0218226 A1 Aug. 2, 2018

Related U.S. Application Data

(63) Continuation of application No. 15/065,681, filed on Mar. 9, 2016, now Pat. No. 9,990,548.

(51) Int. Cl.
*G06K 9/00* (2006.01)
*G05D 1/00* (2006.01)
(Continued)

(52) U.S. Cl.
CPC ....... *G06K 9/00818* (2013.01); *G05D 1/0088* (2013.01); *G06K 9/00791* (2013.01);
(Continued)

(58) Field of Classification Search
CPC ........... G06K 9/00818; G06K 9/00791; G06K 9/00825; G06K 9/6201; G05D 1/0088

See application file for complete search history.

(56) References Cited

U.S. PATENT DOCUMENTS 5,144,685 A 9/1992 Nasar
5,751,852 A 5/1998 Marimont
(Continued)

FOREIGN PATENT DOCUMENTS

CN 102390370 3/2012
CN 202394343 8/2012
(Continued)

OTHER PUBLICATIONS

Office Action issued in EP 17169669.3 dated Jun. 18, 2018.
(Continued)

*Primary Examiner* — Dale W Hilgendorf
(74) *Attorney, Agent, or Firm* — Dority & Manning, P.A.

(57) ABSTRACT

A traffic signal analysis system for an autonomous vehicle (AV) can receive image data from one or more cameras, the image data including an upcoming traffic signaling system located at an intersection. The system can determine an action for the AV through the intersection and access a matching signal map specific to the upcoming traffic signaling system. Using the matching signal map, the system can generate a signal template for the upcoming traffic signaling system and determine a first subset and a second subset of the plurality of traffic signal faces that apply to the action. The system can dynamically analyze the first subset and the second subset to determine a state of the upcoming traffic signaling system for the action, and generate an output for the AV indicating the state of the upcoming traffic signaling system for the action.

20 Claims, 8 Drawing Sheets

(51) Int. Cl.
  *G06K 9/62* (2006.01)
  *G06K 9/52* (2006.01)
  *G06K 9/32* (2006.01)

(52) U.S. Cl.
  CPC ....... *G06K 9/00825* (2013.01); *G06K 9/6201*
    (2013.01); *G06K 9/3241* (2013.01); *G06K*
    *9/52* (2013.01); *G06T 2207/30252* (2013.01)

(56) References Cited

U.S. PATENT DOCUMENTS

| | | |
|---|---|---|
| 5,809,179 A | 9/1998 | Marimont |
| 5,864,214 A | 1/1999 | Brodsky |
| 6,023,655 A | 2/2000 | Nomura |
| 6,385,539 B1 | 5/2002 | Wilson |
| 6,542,111 B1 | 4/2003 | Wilson |
| 6,795,031 B1 | 9/2004 | Walker |
| 7,102,496 B1 | 9/2006 | Ernst, Jr. |
| 7,124,027 B1 | 10/2006 | Ernst, Jr. |
| 7,783,403 B2 | 8/2010 | Breed |
| 7,994,465 B1 | 8/2011 | Bamji |
| 8,145,402 B2 | 3/2012 | Craig |
| 8,245,516 B2 | 8/2012 | Song |
| 8,253,799 B2 | 8/2012 | Elangovan |
| 8,364,334 B2 | 1/2013 | Au |
| 8,412,449 B2 | 4/2013 | Trepagnier |
| 8,521,352 B1 | 8/2013 | Ferguson |
| 8,559,673 B2 | 10/2013 | Fairfield |
| 8,676,430 B1 | 3/2014 | Ferguson |
| 8,825,265 B1 | 9/2014 | Ferguson |
| 8,917,190 B1 | 12/2014 | Melvin |
| 9,036,865 B2 | 5/2015 | Haas |
| 9,045,041 B2 | 6/2015 | Dorum |
| 9,097,800 B1 | 8/2015 | Zhu |
| 9,139,204 B1 | 9/2015 | Zhao |
| 9,140,792 B2 | 9/2015 | Zeng |
| 9,145,140 B2 * | 9/2015 | Ferguson et al. .. G06K 9/00825 |
| 9,158,980 B1 | 10/2015 | Ferguson |
| 9,223,013 B2 | 12/2015 | Stein |
| 9,330,321 B2 | 5/2016 | Schamp |
| 9,383,753 B1 | 7/2016 | Templeton |
| 9,386,230 B1 | 7/2016 | Duran |
| 9,442,487 B1 | 9/2016 | Ferguson |
| 9,459,625 B1 | 10/2016 | Ferguson |
| 9,488,483 B2 | 11/2016 | Ranganathan |
| 9,494,439 B1 | 11/2016 | Ross |
| 9,507,346 B1 | 11/2016 | Levinson |
| 9,552,564 B1 | 1/2017 | Martenis |
| 9,631,933 B1 | 4/2017 | Aula |
| 9,672,446 B1 | 6/2017 | Vallespi-Gonzalez |
| 9,672,734 B1 | 6/2017 | Ratnasingam |
| 9,683,928 B2 | 6/2017 | Swanson |
| 9,701,239 B2 | 7/2017 | Kentley |
| 9,719,801 B1 | 8/2017 | Ferguson et al. |
| 9,739,881 B1 | 8/2017 | Pavek |
| 9,840,256 B1 | 12/2017 | Valois |
| 9,841,763 B1 | 12/2017 | Valois |
| 9,863,928 B1 | 1/2018 | Peterson |
| 9,902,403 B2 | 2/2018 | Donnelly |
| 9,904,375 B1 | 2/2018 | Donnelly |
| 9,914,458 B2 | 3/2018 | Sato |
| 9,916,703 B2 | 3/2018 | Levinson |
| 9,953,535 B1 | 4/2018 | Canavor |
| 9,990,548 B2 * | 6/2018 | Wellington et al. ........................ G06K 9/00818 |
| 10,002,156 B2 | 6/2018 | Lublinsky et al. |
| 10,036,639 B1 | 7/2018 | Cox et al. |
| 10,094,672 B2 | 10/2018 | Utsugi et al. |
| 2002/0109610 A1 | 8/2002 | Katz |
| 2002/0161501 A1 | 10/2002 | Dulin |
| 2003/0001509 A1 | 1/2003 | Leleve |
| 2003/0040944 A1 | 2/2003 | Hileman |
| 2003/0151547 A1 | 8/2003 | Mauro |
| 2004/0085227 A1 | 5/2004 | Mikuriya |
| 2004/0133330 A1 | 7/2004 | Ono |
| 2004/0204812 A1 | 10/2004 | Tran |
| 2005/0010350 A1 | 1/2005 | Hiwatashi |
| 2005/0044944 A1 | 3/2005 | Kogure |
| 2005/0100207 A1 | 5/2005 | Konolige |
| 2005/0113999 A1 | 5/2005 | Tange |
| 2005/0155685 A1 | 7/2005 | Daval |
| 2005/0222744 A1 | 10/2005 | Sakata |
| 2006/0002586 A1 | 1/2006 | Aggarwal |
| 2006/0126975 A1 | 6/2006 | McKellar |
| 2006/0128087 A1 | 6/2006 | Bamji |
| 2006/0208911 A1 | 9/2006 | Davis |
| 2006/0217882 A1 | 9/2006 | Takashima |
| 2006/0223637 A1 | 10/2006 | Rosenberg |
| 2006/0259225 A1 | 11/2006 | Ono |
| 2007/0050121 A1 | 3/2007 | Ammon |
| 2007/0229490 A1 | 10/2007 | Boudreau |
| 2007/0268364 A1 | 11/2007 | Neff |
| 2008/0033645 A1 | 2/2008 | Levinson |
| 2008/0040004 A1 | 2/2008 | Breed |
| 2008/0129475 A1 | 6/2008 | Breed |
| 2008/0162036 A1 | 7/2008 | Breed |
| 2009/0010495 A1 | 1/2009 | Schamp |
| 2009/0043439 A1 | 2/2009 | Barfoot |
| 2009/0043440 A1 | 2/2009 | Matsukawa |
| 2009/0070034 A1 | 3/2009 | Oesterling |
| 2009/0146813 A1 | 6/2009 | Nuno |
| 2009/0150036 A1 | 6/2009 | Craig |
| 2009/0005961 A1 | 8/2009 | Grabowski |
| 2009/0216600 A1 | 8/2009 | Hill |
| 2009/0228204 A1 | 9/2009 | Zavoli |
| 2009/0306859 A1 | 12/2009 | Tichy |
| 2009/0319129 A1 | 12/2009 | Ghoneim |
| 2009/0322872 A1 | 12/2009 | Muehlmann |
| 2009/0326991 A1 | 12/2009 | Wei |
| 2010/0013615 A1 | 1/2010 | Hebert |
| 2010/0020170 A1 | 1/2010 | Higgins-Luthman |
| 2010/0023213 A1 | 1/2010 | Mizuno |
| 2010/0023214 A1 | 1/2010 | Horiguchi |
| 2010/0030460 A1 | 2/2010 | Sawai |
| 2010/0165323 A1 | 7/2010 | Fiess |
| 2010/0217491 A1 | 8/2010 | Naito |
| 2010/0235083 A1 | 9/2010 | Takahata |
| 2010/0245123 A1 | 9/2010 | Prasad |
| 2010/0250052 A1 | 9/2010 | Ogino |
| 2010/0250056 A1 | 9/2010 | Perkins |
| 2010/0256836 A1 | 10/2010 | Mudalige |
| 2010/0262359 A1 | 10/2010 | Motoyama |
| 2010/0274469 A1 | 10/2010 | Takahata |
| 2010/0280751 A1 | 11/2010 | Breed |
| 2010/0295946 A1 | 11/2010 | Reed |
| 2010/0299063 A1 | 11/2010 | Nakamura |
| 2011/0012511 A1 | 1/2011 | Watanabe |
| 2011/0043377 A1 | 2/2011 | McGrath |
| 2011/0046784 A1 | 2/2011 | Anderson |
| 2011/0054791 A1 | 3/2011 | Surampudi |
| 2011/0060478 A1 | 3/2011 | Nickolaou |
| 2011/0285982 A1 | 11/2011 | Breed |
| 2012/0006610 A1 | 1/2012 | Wallace |
| 2012/0045090 A1 | 2/2012 | Bobbitt |
| 2012/0083959 A1 | 4/2012 | Dolgov |
| 2012/0121161 A1 | 5/2012 | Eade |
| 2012/0158313 A1 | 6/2012 | Wang |
| 2012/0242492 A1 | 9/2012 | Grunfeld |
| 2012/0283912 A1 | 11/2012 | Lee |
| 2012/0296539 A1 | 11/2012 | Cooprider |
| 2012/0310516 A1 | 12/2012 | Zeng |
| 2012/0327410 A1 | 12/2012 | Maston |
| 2013/0015984 A1 | 1/2013 | Yamashiro |
| 2013/0018575 A1 | 1/2013 | Birken |
| 2013/0060461 A1 | 3/2013 | Wong |
| 2013/0083159 A1 | 4/2013 | Ooshima |
| 2013/0117321 A1 | 5/2013 | Fisher |
| 2013/0215115 A1 | 8/2013 | Jenkins |
| 2013/0314503 A1 | 11/2013 | Nix |
| 2013/0325279 A1 | 12/2013 | Fujimoto |
| 2014/0002277 A1 | 1/2014 | Fulger |
| 2014/0005933 A1 | 1/2014 | Fong |
| 2014/0025232 A1 | 1/2014 | Cuddihy |
| 2014/0046585 A1 | 2/2014 | Morris |

(56) References Cited

U.S. PATENT DOCUMENTS

| | | |
|---|---|---|
| 2014/0047250 A1 | 2/2014 | Maletsky |
| 2014/0081573 A1 | 3/2014 | Urmson |
| 2014/0118363 A1 | 5/2014 | Hakura |
| 2014/0133330 A1 | 5/2014 | Chapman |
| 2014/0136414 A1 | 5/2014 | Abhyanker |
| 2014/0188363 A1 | 7/2014 | Eckert |
| 2014/0188386 A1 | 7/2014 | Obara |
| 2014/0222298 A1 | 8/2014 | Gurin |
| 2014/0247357 A1 | 9/2014 | Sekiguchi |
| 2014/0302774 A1 | 10/2014 | Burke |
| 2014/0306835 A1 | 10/2014 | Ricci |
| 2014/0307247 A1 | 10/2014 | Zhu |
| 2014/0336842 A1 | 11/2014 | Jang |
| 2014/0336935 A1 | 11/2014 | Zhu |
| 2014/0340304 A1 | 11/2014 | Dewan |
| 2015/0003670 A1 | 1/2015 | Kuehnle |
| 2015/0035985 A1 | 2/2015 | Conneely |
| 2015/0061856 A1 | 3/2015 | Raman |
| 2015/0112585 A1 | 4/2015 | Knepper |
| 2015/0124428 A1 | 5/2015 | Hadrath |
| 2015/0142248 A1 | 5/2015 | Han et al. |
| 2015/0166072 A1 | 6/2015 | Powers |
| 2015/0202770 A1 | 7/2015 | Patron |
| 2015/0203107 A1 | 7/2015 | Lippman |
| 2015/0210274 A1 | 7/2015 | Clark Anna |
| 2015/0210277 A1 | 7/2015 | Ben Shalom |
| 2015/0224845 A1 | 8/2015 | Anderson |
| 2015/0247733 A1 | 9/2015 | Horihata |
| 2015/0251659 A1 | 9/2015 | Fischer |
| 2015/0266471 A1 | 9/2015 | Ferguson |
| 2015/0310146 A1 | 10/2015 | Tanzmeister |
| 2015/0331422 A1 | 11/2015 | Hartung |
| 2015/0344038 A1 | 12/2015 | Stenneth |
| 2015/0346727 A1 | 12/2015 | Ramanujam |
| 2015/0362322 A1 | 12/2015 | Ozaki |
| 2015/0369612 A1 | 12/2015 | Ding |
| 2016/0009218 A1 | 1/2016 | Nakashima |
| 2016/0016663 A1 | 1/2016 | Stanek |
| 2016/0054135 A1 | 2/2016 | Fowe |
| 2016/0055744 A1 | 2/2016 | Branson |
| 2016/0125608 A1 | 5/2016 | Sorstedt |
| 2016/0133131 A1 | 5/2016 | Grimm |
| 2016/0167582 A1 | 6/2016 | Chen |
| 2016/0176408 A1 | 6/2016 | Lynch |
| 2016/0178802 A1 | 6/2016 | Stainvas Olshansky |
| 2016/0180171 A1 | 6/2016 | Kamata |
| 2016/0207537 A1 | 7/2016 | Urano |
| 2016/0267720 A1 | 9/2016 | Mandella |
| 2016/0276131 A1 | 9/2016 | Platzgummer |
| 2016/0349063 A1 | 12/2016 | Maurer |
| 2016/0357188 A1 | 12/2016 | Ansari |
| 2016/0368504 A1 | 12/2016 | Kieren |
| 2016/0370191 A1 | 12/2016 | Utsugi |
| 2017/0008521 A1 | 1/2017 | Braunstein |
| 2017/0008522 A1 | 1/2017 | Sato |
| 2017/0015317 A1 | 1/2017 | Fasola |
| 2017/0015318 A1 | 1/2017 | Scofield |
| 2017/0016731 A1 | 1/2017 | Koshiba |
| 2017/0023659 A1 | 1/2017 | Bruemmer |
| 2017/0059336 A1 | 3/2017 | Huang |
| 2017/0090478 A1 | 3/2017 | Blayvas |
| 2017/0120814 A1 | 5/2017 | Duran Bill |
| 2017/0123421 A1 | 5/2017 | Kentley |
| 2017/0123429 A1 | 5/2017 | Levinson |
| 2017/0124781 A1 | 5/2017 | Douillard |
| 2017/0126975 A1 | 5/2017 | Duran |
| 2017/0146991 A1 | 5/2017 | Parekh |
| 2017/0168489 A1 | 6/2017 | Rander |
| 2017/0172290 A1 | 6/2017 | Sampaio |
| 2017/0174194 A1 | 6/2017 | Baumgaertner |
| 2017/0193826 A1 | 7/2017 | Marueli |
| 2017/0227647 A1 | 8/2017 | Baik |
| 2017/0229029 A1 | 8/2017 | Klinger |
| 2017/0243073 A1 | 8/2017 | Raghu et al. |
| 2017/0248963 A1 | 8/2017 | Levinson |
| 2017/0255966 A1 | 9/2017 | Khoury |
| 2017/0262709 A1 | 9/2017 | Wellington |
| 2017/0270361 A1 | 9/2017 | Puttagunta |
| 2017/0307763 A1 | 10/2017 | Browning |
| 2017/0309172 A1 | 10/2017 | Linder |
| 2017/0313324 A1 | 11/2017 | Kumai |
| 2017/0315229 A1 | 11/2017 | Pavek |
| 2017/0316333 A1 | 11/2017 | Levinson |
| 2017/0316696 A1 | 11/2017 | Bartel |
| 2017/0345400 A1 | 11/2017 | Li |
| 2017/0351261 A1 | 12/2017 | Levinson |
| 2017/0351984 A1 | 12/2017 | Rasheed |
| 2017/0357669 A1 | 12/2017 | Offenhaeuser |
| 2017/0358204 A1 | 12/2017 | Modica |
| 2018/0003511 A1 | 1/2018 | Browning et al. |
| 2018/0004225 A1 | 1/2018 | Milstein et al. |
| 2018/0004226 A1 | 1/2018 | Milstein |
| 2018/0045519 A1 | 2/2018 | Ghadiok |
| 2018/0060778 A1 | 3/2018 | Guo |
| 2018/0061242 A1 | 3/2018 | Bavar |
| 2018/0143639 A1 | 5/2018 | Singhal |
| 2018/0164119 A1 | 6/2018 | Becker |
| 2018/0189578 A1 | 7/2018 | Yang |
| 2018/0304891 A1 | 10/2018 | Heidenreich |

FOREIGN PATENT DOCUMENTS

| | | |
|---|---|---|
| CN | 202394343 U | 8/2012 |
| CN | 103370249 | 10/2013 |
| CN | 104601648 | 5/2015 |
| CN | 104601648 A | 5/2015 |
| DE | 102014114438 | 4/2015 |
| EP | 3032458 | 6/2016 |
| JP | H08334365 | 3/2005 |
| JP | 2005-115911 | 4/2005 |
| JP | 2006-159939 | 6/2006 |
| JP | 2008-027239 | 2/2008 |
| JP | 2008-262459 | 10/2008 |
| JP | 2009-075756 | 4/2009 |
| JP | 2012-127861 | 7/2012 |
| JP | 2015-007874 | 1/2015 |
| KR | 100862561 | 10/2008 |
| RU | 2400592 | 9/2010 |
| RU | 132393 | 9/2013 |
| WO | WO 2001/065454 | 9/2001 |
| WO | WO 2011/038018 | 3/2011 |
| WO | WO 2011/055978 | 5/2011 |
| WO | WO 2013155661 | 10/2013 |
| WO | WO 2013155661 A1 | 10/2013 |
| WO | WO 2014072972 | 5/2014 |
| WO | WO 2014108267 | 7/2014 |
| WO | WO 2014/147361 | 9/2014 |
| WO | WO 2014131400 | 9/2014 |

OTHER PUBLICATIONS

Hrabar, "3D path planning and stereo-based obstacle avoidance for rotorcraft UAVs", Intelligent Robots and Systems, 2008, IROS 2008. IEEE/RSJ International Conference on, Sep. 22, 200.

Hrabar, "An evaluation of stereo and laser-based range sensing for rotorcraft unmanned aerial vehicle obstacle avoidance", Journal of Field Rebotics, vol. 29, No. 2, Oct. 18, 2011.

Ros, et al., "Vision-Based Offline-Online Perception Paradigm for Autonomous Driving", 2015 IEEE Winter Conference on Applications of Computer Vision, IEEE, Jan. 5, 2015.

IPRP issued in PCT/US2016/066235 dated Jun. 21, 2018.

Gilbert Held, Inter- and Intra-Vehicle Communications 1st Edition, Nov. 8, 2007, Auerbach ublications, XP055503113, ISBN: 978-1-4200-5221-3, pp. ToC, Ch01, 41-50, Ch03, 93-100, Ind.

Jack Erjavec, Automotive Technology: A Systems Approach, Feb. 21, 2014, Delmar Cengage Learning, XP055506654, ISBN: 978-1-133-61231-5, pp. ToC, 616-620, 647-651, 664-668.

EESR issued in EP 16793475.1 dated Sep. 21, 2018.

International Search Report and Written Opinion issued in PCT/US2016/031929 dated Aug. 17, 2016.

International Search Report and Written Opinion issued in PCT/US2016/066235 dated Mar. 27, 2017.

(56) References Cited

OTHER PUBLICATIONS

Azim Asma, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.
Andres Serna et al.: "Detection, segmentation and classification of 3D urban objects using mathematical morphology and supervised learning", ISPRS Journal of Photogrammetry and Remote Sensing, vol. 93, Jul. 1, 2014, pp. 243-255, Amsterdam, NL.
EESR issued in EP 17169669.3 dated Sep. 13, 2017.
Office Action issued in CN 201710311393.1 dated Nov. 12, 2018.
Ansari, Partial Shape Recognition. IEEE 1989, A Landmark-Based Approach, CH2809-2/89/000-0831, 6 pags.
Azim et al., "Layer-Based Supervised Classification of Moving Objects in Outdoor Dynamic Environment Using 3D Laser Scanner", IEEE Intelligent Vehicles Symposium Proceedings, Jun. 8, 2014, pp. 1408-1414.
Erjavec, Jack, "Automotive Technology: A Systems Approach", Feb. 21, 2014, Delmar Cengage Learning, XP055506654, ISBN 978-1-133-61231-5, pp. 616-620, 647-651, 664-668.
Held, Gilbert, Inter- and Intra- Vehicle Communications 1st Edition, Nov. 8, 2007, Auerbach Publications, XP055503113, ISBN 978-1-4200-5221-3, Chapter 1, pp. 41-50, Chapter 3.
Hrabar et al., "An Evaluation of Stereo and Laser-Based Range Sensing for Rotorcraft Unmanned Aerial Vehicle Obstacle Avoidance", Journal of Field Robotics, vol. 29, No. 2, Oct. 18, 2011, 25 pages.
Hrabar et al., "3D Path Planning and Stereo-Based Obstacle Avoidance for Rotorcraft UAVs" Intelligent Robots and Systems, IEEE International Conference on intelligent Robots and Systems, Sep. 22, 2008, 8 pages.
Ros et al., "Vision-Based Offline-Online Perception Paradigm for Autonomous Driving", IEEE Winter Conference on Applications of Computer Vision, Jan. 5, 2015, 8 pages.
Serna et al., "Detection, Segmentation and Classification of 3D Urban Objects Using Mathematical Morphology and Supervised Learning", ISPRS Journal of Photogrammetry and Remote Sensing, vol. 93, Jul. 1, 2014, Amsterdam, Netherlands, pp. 243-255.
Winner, Hermann, "Handbuch Fahrerassistanzsystem: Grundlagen, Komponenten und Systeme fur Aktive Sicherheit und Komfort", Apr. 20, 2015, Springer, 132 pages.
Extended European Search Report for Application No. EP16793475.1 dated Sep. 21, 2018, 14 pages.
Extended European Search Report for Application No. EP17169669.3 dated Sep. 13, 2019, 10 pages.
International Search Report and Written Opinion for Application No. PCT/US2016/066235 dated Mar. 27, 2017, 46 pages.
International Search Report and Written Opinion for Application No. PCT/US2016/031929 dated Aug. 17, 2016, 12 pages.
International Search Report and Written Opinion for Application No. PCT /US2017/046796 dated Feb. 28, 2018, 7 pages.
International Search Report and Written Opinion for Application No. PCT/US2017/056277 dated Apr. 5, 2018, 7 pages.
International Search Report and Written Opinion for Application No. PCT/US2017/040532 dated Jan. 11, 2018, 16 pages.
International Preliminary Report on Patentability for Application No. PCT/US2016/066235 dated Jun. 21, 2018, 42 pages.
Office Action for CN201680040538.2 dated Sep. 10, 2018, 38 pages.
Office Action for CN201710311393.1 dated Nov. 12, 2018, 29 pages.
Office Action for EP 17169669.3, dated Jun. 18, 2018, 7 pages.

\* cited by examiner

TRAFFIC SIGNAL ANALYSIS SYSTEM

CROSS-REFERENCE TO RELATED APPLICATION

This application is a continuation of U.S. patent application Ser. No. 15/065,681, titled "Traffic Signal Analysis System," filed on Mar. 9, 2016; the aforementioned application being hereby incorporated by reference in its entirety.

BACKGROUND

Traffic accidents worldwide cause over one million deaths per year, and over 30,000 deaths per year in the U.S. alone. Despite steadily increasing safety standards for automobiles and road construction, distracted driving, intoxicated driving, driver incompetence or inability, dangerous roads and weather conditions, high traffic roads, and extensive road commutes remain as perpetual factors in the lack of a perspicuous decline in traffic-related deaths and injuries. The advent of autonomous vehicle technology—along with the persistent increases in machine learning and artificial intelligence technology—may prove to circumvent many of the unfortunate factors that lead to traffic accidents.

Widespread concerns regarding autonomous vehicles on public roads typically relate to the ability of such vehicles to make safe and trustworthy decisions when confronted with complex situations. On a typical journey, an autonomous vehicle may encounter countless decision-making instances where loss of life is possible—however unlikely. Road intersections include traffic signaling systems that can range from simple three-bulb faces to complex directional and yielding signals. Safe, reliable, skillful, and responsible decision-making by autonomous vehicles at any intersection is necessary in order to advance the public use of autonomous vehicles and eventually prevent the vast majority of traffic accident types occurring in present road environments.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
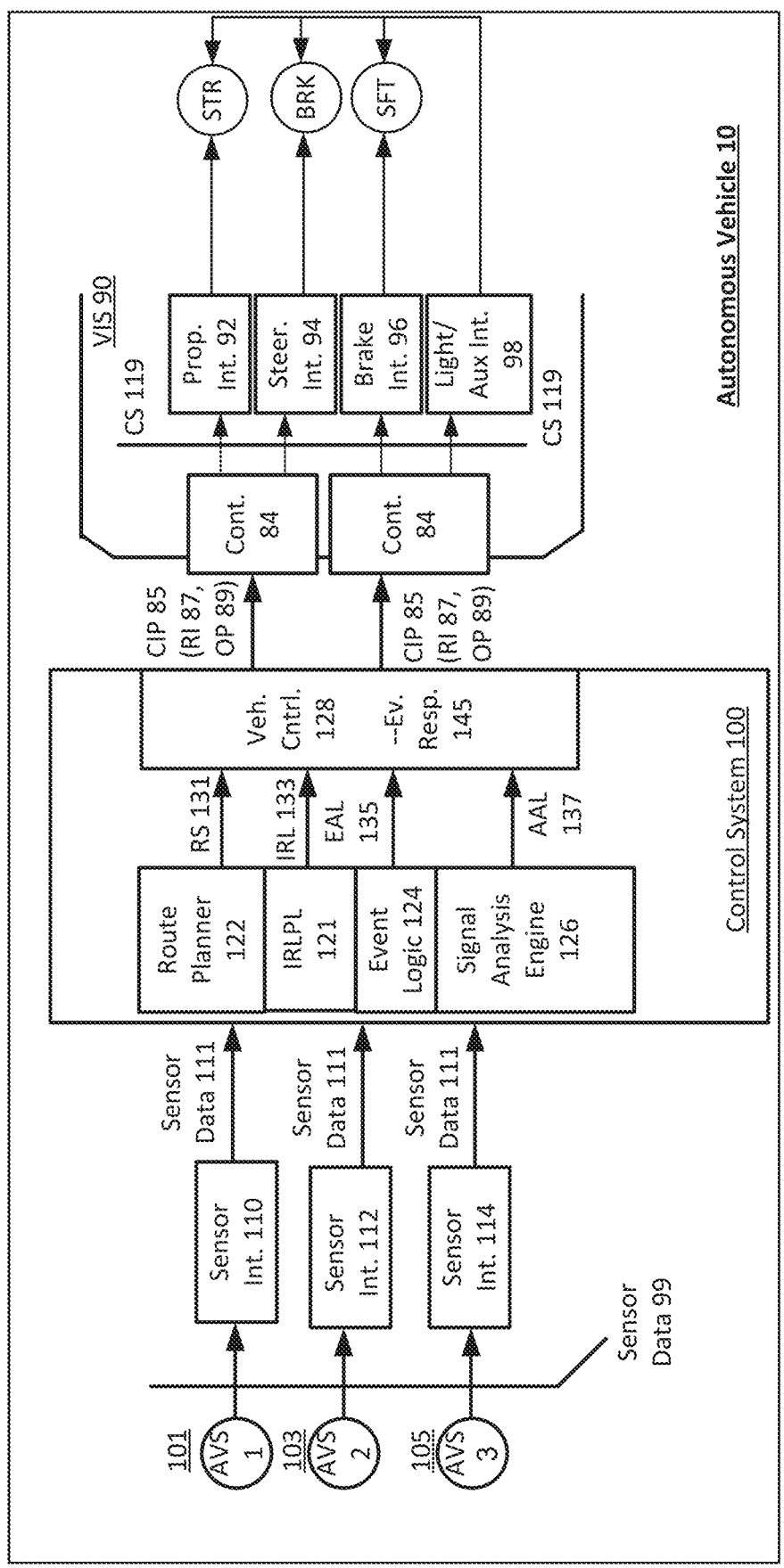
FIG. 1 shows a block diagram illustrating an autonomous vehicle in accordance with example implementations.

A traffic signal analysis system is provided to resolve traffic intersection decisions by an autonomous vehicle. According to examples described herein, the traffic signal analysis system can be included as an independent, dedicated component of the autonomous vehicle, or certain aspects of the traffic signal analysis system may be integrated with other features of the autonomous vehicle. The traffic signal analysis system can receive or monitor image data from one or more cameras, and identify a traffic signaling system, including any number of traffic lights, in the image data. In certain implementations, the signal analysis system can determine a pass-through action for the autonomous vehicle through the intersection. For example, based on current route data (and/or navigation plan data) for the autonomous vehicle, the signal analysis system can determine whether the autonomous vehicle should be instructed to stop, go straight, turn right, turn left, or make a U-turn at the intersection.

According to many examples, the signal analysis system can perform a localization of the autonomous vehicle to determine its pose (e.g., position, bearing, and/or orientation), and access a matching signal map (e.g., stored in a memory of the autonomous vehicle or the signal analysis system itself, or stored in a remote memory or system accessible by the signal analysis system via a network) that includes characteristic information indicating the properties of the identified traffic signaling system. In many aspects, the signal analysis system can utilize the matching signal map to generate a signal template for the traffic signaling system on the image data. The signal template can define at least one region of interest in the image data where a traffic signal face is expected to be in the image data. Based on the characteristic information and the image data, the signal analysis system can identify a state of the traffic signaling system for the pass-through action, and then generate an output for the autonomous vehicle indicating the state of the traffic signaling system for the pass-through action. For example, the signal analysis system can determine that the traffic signal for the pass-through action is green, and generate an output signal reflecting the green state. The signal analysis system can then transmit the output signal to the autonomous vehicle control system, which can respond by performing the pass-through action accordingly (e.g., driving straight through the intersection).

In some aspects, the signal analysis system can identify the state of the traffic signaling system for the pass-through action by dynamically analyzing the region(s) of interest, defined by the generated template, as the autonomous vehicle approaches the intersection. As such, the signal analysis system can dynamically update the template and analyze the region(s) of interest to determine the state of the traffic signaling system for the pass-through action in real time. In some instances, the traffic signaling system can include multiple signal faces. In such circumstances, the signal analysis system can identify and access the matching signal map for the traffic signal to determine its characteristics (e.g., the number and locations of faces, the subsets of the faces, representations of each bulb or lens in each subset, right-of-way characteristics, and/or lane action options). The signal analysis system can generate the template based on the characteristics, and project the template on the image data for analysis.

As used herein, a "subset" of a traffic signaling system corresponds directly to the right-of-way for a specified pass-through action (e.g., left turn, straight-through progression, right turn, U-turn). Thus, the subset may be represented on multiple signal faces of the traffic signaling system. For example, a straight-through action can be directed by one subset of the traffic signaling system, but lights for the straight-through action may be included on multiple signal faces. Furthermore, a light (e.g., a red light) for the straight-through action may also direct a second pass-through action (e.g., a left turn). Accordingly, the left turn action may have its own subset directing right-of-way (e.g., green and yellow left turn signals), but may also depend on another set (e.g., a red light for the straight-through action).

In certain examples, the signal analysis system can identify a subset of the traffic signaling system that corresponds to the pass-through action for the autonomous vehicle, and analyze that subset to identify the state of traffic signaling system for the pass-through action (e.g., stop, go, yield to vehicles, yield to pedestrians, etc.). According to some examples, the signal analysis system can analyze the subset by performing a probabilistic matching operation for portions of the set (e.g., each bulb, or the group of bulbs in a traffic light face that are part of the subset) to determine the state of the subset for each traffic light face in the subset. The matching operation, as described herein, can resolve occlusions (e.g., by prioritizing faces), identify and resolve faulty signals, analyze multiple subsets for a given pass-through action (e.g., when a left or right turn is dependent on a second subset), and the like.

Among other benefits, examples described herein achieve a technical effect of enhancing the safety, reliability, and trustworthiness of autonomous vehicles when passing through intersections.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles may drive without any human assistance from within or external to the vehicle. Such vehicles often are required to make advanced determinations regarding how the vehicle is to behave given the challenging surroundings of the vehicle environment.

System Description

FIG. 1 shows a block diagram illustrating an autonomous vehicle in accordance with example implementations. In an example of FIG. 1, a control system 100 can be used to autonomously operate an autonomous vehicle 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes a computer or processing system which operates to process sensor data that is obtained on the vehicle with respect to a road segment upon which the vehicle 10 operates. The sensor data can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

Examples recognize that urban driving environments present significant challenges to autonomous vehicles. In particular, the behavior of objects such as pedestrians, bicycles, and other vehicles can vary based on geographic region (e.g., country or city) and locality (e.g., location within a city). Moreover, the manner in which other drivers respond to pedestrians, bicyclists and other vehicles varies by geographic region and locality.

The autonomous vehicle 10 can be equipped with multiple types of sensors 101, 103, 105, which combine to provide a computerized perception of the space and environment surrounding the vehicle 10. Likewise, the control system 100 can operate within the autonomous vehicle 10 to receive sensor data from the collection of sensors 101, 103, 105, and to control various electromechanical interfaces for operating the vehicle on roadways.

In more detail, the sensors 101, 103, 105 operate to collectively obtain a complete sensor view of the vehicle 10, and further to obtain situational information proximate to the vehicle 10, including any potential hazards in a forward operational direction of the vehicle 10. By way of example, the sensors 101, 103, 105 can include multiple sets of camera sensors 101 (video camera, stereoscopic pairs of cameras or depth perception cameras, long range cameras), remote detection sensors 103 such as provided by radar or LIDAR, proximity or touch sensors 105, and/or sonar sensors (not shown).

Each of the sensors 101, 103, 105 can communicate with the control system 100 utilizing a corresponding sensor interface 110, 112, 114. Each of the sensor interfaces 110, 112, 114 can include, for example, hardware and/or other logical component which is coupled or otherwise provided with the respective sensor. For example, the sensors 101, 103, 105 can include a video camera and/or stereoscopic camera set which continually generates image data of an environment of the vehicle 10. As an addition or alternative, the sensor interfaces 110, 112, 114 can include a dedicated processing resource, such as provided with a field programmable gate array ("FPGA") which can, for example, receive and/or process raw image data from the camera sensor.

In some examples, the sensor interfaces 110, 112, 114 can include logic, such as provided with hardware and/or programming, to process sensor data 99 from a respective sensor 101, 103, 105. The processed sensor data 99 can be outputted as sensor data 111. As an addition or variation, the control system 100 can also include logic for processing raw or pre-processed sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the autonomous vehicle 10 follows a current route. Thus, while the vehicle 10 is actively drive along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the autonomous vehicle 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include a route planner 122, event logic 124, signal analysis engine 126, and a vehicle control 128. The vehicle control 128 represents logic that converts alerts of event logic 124 ("event alert 135") and signal analysis engine 126 ("anticipatory alert 137") into commands 85 that specify a vehicle action or set of actions.

Additionally, the route planner 122 can select one or more route segments that collectively form a path of travel for the autonomous vehicle 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

In some examples, the control system 100 can also include intra-road segment localization and positioning logic ("IRLPL 121"). The IRLPL 121 can utilize sensor data 111 in the form of LIDAR, stereoscopic imagery, and/or depth sensors. While the route planner 122 can determine the road segments of a road path along which the vehicle 10 operates, IRLPL 121 can identify an intra-road segment location 133 for the vehicle 10 within a particular road segment. The intra-road segment location 133 can include contextual information, such as marking points of an approaching roadway where potential ingress into the roadway (and thus path of the vehicle 10) may exist. The intra-road segment location 133 can be utilized by the event logic 124 and/or the vehicle control 128, for the purpose of detecting potential points of interference or collision on the portion of the road segment in front of the vehicle 10. The intra-road segment location 133 can also be used to determine whether detected objects can collide or interfere with the vehicle 10, and further to determine response actions for anticipated or detected events.

With respect to an example of FIG. 1, the event logic 124 can trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. For example, an event can be scored or classified between a range of likely harmless (e.g., small debris in roadway) to very harmful (e.g., vehicle crash may be imminent). In turn, the vehicle control 128 can determine a response based on the score or classification. Such response can correspond to an event avoidance action 145, or an action that the vehicle 10 can perform to maneuver the vehicle 10 based on the detected event and its score or classification. By way of example, the vehicle response can include a slight or sharp vehicle maneuvering for avoidance using a steering control mechanism and/or braking component. The event avoidance action 145 can be signaled through the commands 85 for controllers 84 of the vehicle interface subsystem 90.

The signal analysis engine 126 can operate to utilize forward directional sensor data 111 to detect traffic signaling systems in order to provide anticipatory alerts 137 to the vehicle control 128 to, for example, stop at a stop light or pass-through an intersection (e.g., when a green light condition is present for the pass-through action). In analyzing the sensor data 111 (e.g., forward facing stereo camera data), the signal analysis engine 126 can identify a state of an oncoming traffic signaling system for a pass-through action (e.g., as determined by the route planner 122), and then generate an anticipatory alert 137 for the vehicle control 128 indicating the state of the traffic signaling system for the pass-through action. The anticipatory alert 137 can be processed by the vehicle control 128 to generate control commands 85 for execution on the autonomous vehicles 10 braking, acceleration, and steering systems. Further description of the functionality of the signal analysis engine 126 is provided in the below description of FIGS. 2-8.

Figure 2:
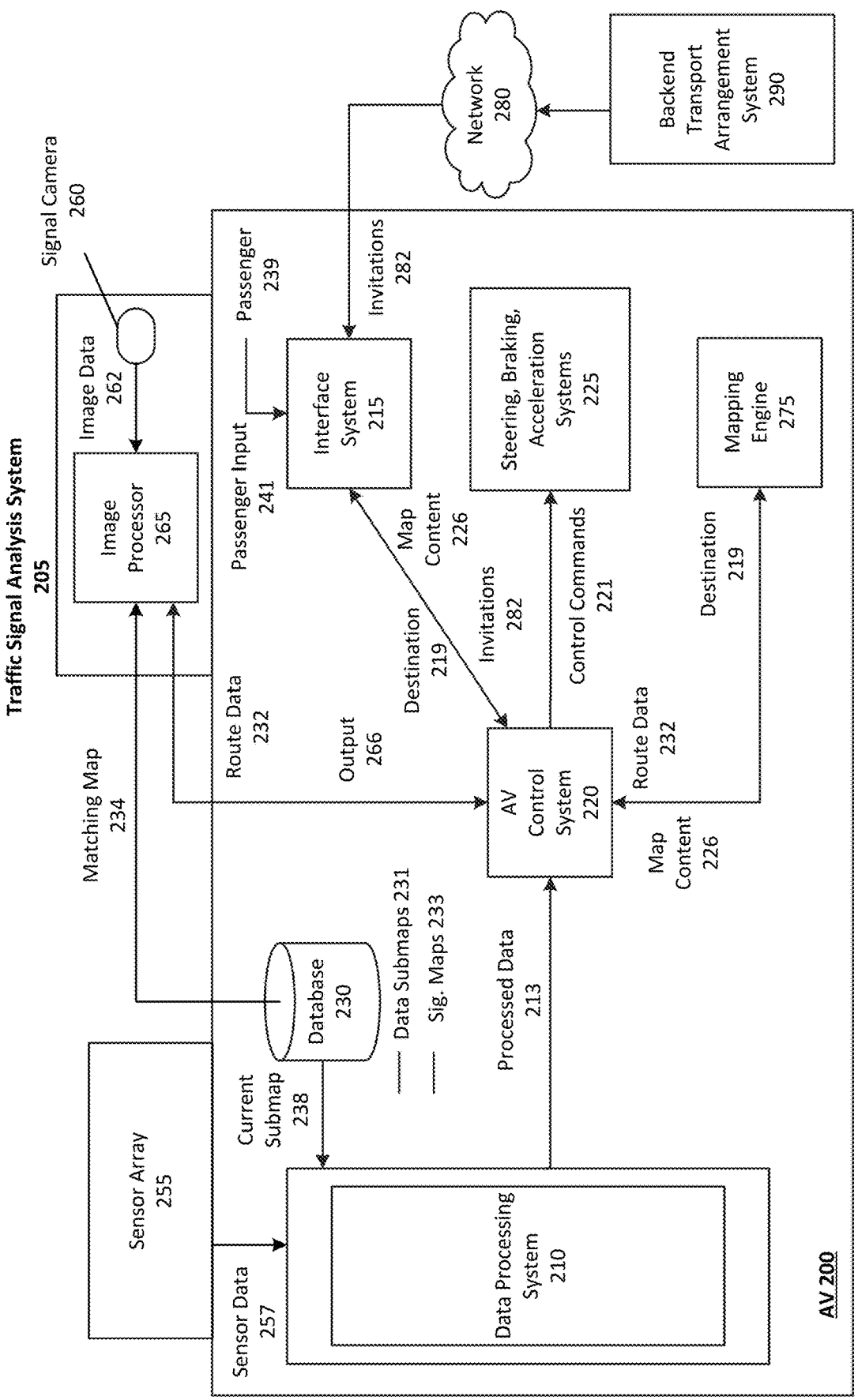
FIG. 2 is a block diagram illustrating an example autonomous vehicle including a traffic signal analysis system, as described herein.

FIG. 2 is a block diagram illustrating an example autonomous vehicle including a traffic signal analysis system, as described herein. The autonomous vehicle 200 shown in FIG. 2 can include some or all aspects and functionality of the autonomous vehicle 10 described with respect to FIG. 1. Referring to FIG. 2, the autonomous vehicle 200 can include a sensor array 255 that can provide sensor data 257 to an on-board data processing system 210. As described herein, the sensor array 255 can include any number of active or passive sensors that continuously detect a situational environment of the autonomous vehicle 200. For example, the sensor array 255 can include a number of camera sensors (e.g., stereo cameras), LIDAR sensor(s), proximity sensors, radar, and the like. The data processing system 210 can utilize the sensor data 257 to detect the situational conditions of the autonomous vehicle 200 as the AV 100 travels along a current route. For example, the data processing system 210 can identify potential obstacles or road hazards—such as pedestrians, bicyclists, objects on the road, road cones, road signs, animals, etc.—in order to enable an AV control system 220 to react accordingly.

In certain implementations, the data processing system 210 can utilize data sub-maps 231 stored in a database 230 of the autonomous vehicle 200 (or accessed remotely from the backend system 290 via the network 280) in order to perform localization and pose operations to determine a current location and orientation of the autonomous vehicle 200 in relation to a given region (e.g., a city). In some examples, the data processing system 210, or the AV control system 220, can provide this pose information to the traffic signal analysis system 205 to enable the analysis system 205 to access matching signal maps 234 from the database 230 for traffic signal analysis. Alternatively, the traffic signal analysis system 205 can include positioning resources to determine the pose of the autonomous vehicle 200.

The signal maps 233 in the database 230 can include previously recorded traffic signal data verified for accuracy and quality (e.g., by human analysts or algorithmically). Each signal map 233 can detail an entire intersection or a single directional aspect of the intersection. For example, a signal map 233 can identify the westbound traffic signal system of a particular intersection, and disregard northbound, eastbound, and southbound traffic signals. Furthermore, each signal map 233 can include data indicating the characteristics and properties of the traffic signaling system. Such data can be in the form of recorded image data including metadata indicating the expected positions and regions of interest of the traffic signal faces of the signaling system. Additionally or alternatively, each signal map 233 can include coordinate and orientation data for the signaling system itself, subset data identifying each of the subsets of the signaling system, and/or lane association and right-of-way information for each lane and for each pass-through-action, as described in detail below.

The data sub-maps 231 in the database 230 can comprise previously recorded sensor data, such as stereo camera data, radar maps, and/or point cloud LIDAR maps. The data sub-maps 231 can enable the data processing system 210 to compare the sensor data 257 from the sensor array 255 with a current data sub-map 238 to identify obstacles and potential road hazards in real time. The data processing system 210 can provide the processed sensor data 213—identifying such obstacles and road hazards—to the AV control system 220, which can react accordingly by operating the steering, braking, and acceleration systems 225 of the autonomous vehicle 200 to perform low level maneuvering.

In many implementations, the AV control system 220 can receive a destination 219 from, for example, an interface system 215 of the autonomous vehicle 200. The interface system 215 can include any number of touch-screens, voice sensors, mapping resources, etc. that enable a passenger 239 to provide a passenger input 241 indicating the destination 219. For example, the passenger 239 can type the destination 219 into a mapping engine 275 of the autonomous vehicle 200, or can speak the destination 219 into the interface system 215. Additionally or alternatively, the interface system 215 can include a wireless communication module that can connect the autonomous vehicle 200 to a network 280 to communicate with a backend transport arrangement system 290 to receive invitations 282 to service a pick-up or drop-off request. Such invitations 282 can include destination 219 (e.g., a pick-up location), and can be received by the autonomous vehicle 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate passenger pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the autonomous vehicle 200 to the destination 219 along the selected route. For example, the AV control system 220 can dynamically generate control commands 221 for the autonomous vehicle's steering, braking, and acceleration system 225 to actively drive the autonomous vehicle 200 to the destination 219 along the selected route. Optionally, the map content 226 showing the current route traveled can be streamed to the interior interface system 215 so that the passenger(s) 239 can view the route and route progress in real time.

In many examples, while the AV control system 220 operates the steering, braking, and acceleration systems 225 along the current route on a high level, and the processed data 213 provided to the AV control system 220 can indicate low level occurrences, such as obstacles and potential hazards to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly.

According to examples described herein, the traffic signal analysis system 205 can analyze forward traffic signals along the current route, and aid the AV control system 220 in safely traveling to the destination 219. For traffic signal resolution, the AV control system 220 can operate in a high caution state or mode, and generate the control commands 221 to operate the autonomous vehicle 200 based on an output 266 of the signal analysis system 205 as well as the processed sensor data 213. The output 266 can ultimately assist the AV control system 220 by indicating whether, at a given intersection, the autonomous vehicle 200 should stop, proceed with a right-of-way directive, or proceed with a yield directive (e.g., yielding to vehicles, bicycles, or pedestrians).

According to examples described herein, the traffic signal analysis system 205 can include a dedicated signal camera 260. In one example, the signal camera 260 is a single camera that records image data 262 in a forward operating direction of the autonomous vehicle 200. In other examples, the traffic signal analysis system 205 can utilize resources of the sensor array (e.g., forward facing camera or stereo cameras). While other sensor systems (e.g., the camera system or the stereo camera system) of the autonomous vehicle 200 can change settings reactively to changing lighting conditions, in some implementations, the signal camera 260 can operate with constant camera settings tuned specifically to detect traffic signals. Such constant settings can include constant aperture settings, resolution, frame rate and/or shutter speed, color temperature settings, gain or ISO settings, saturation and contrast settings, focus, and the like. In an alternate implementation, portions of the sensor array 255 utilized by the traffic signal analysis system 205 can alternately switch between a mode that changes settings reactively to changing lighting conditions for use by the autonomous vehicle 200, and a mode that has constant settings for use by the traffic signal analysis system 205, thus not requiring a separate signal camera 260.

The signal camera 260 can record image data 262, which can be monitored and analyzed by an image processor 265 of the signal analysis system 205. The image processor 265 can identify traffic signals in the image data 262, and access a matching map 234 to generate a template for the traffic signal. As described herein, the matching map 234 can include characteristic information indicating the properties of the traffic signal, including subsets for the signal system, the number of signal faces and their locations, lane association data, and/or right-of-way data. Utilizing the characteristic information of the traffic signal, the image processor 265 can dynamically generate a template defining regions of interest (e.g., comprising region blocks where the image processor 265 can analyze and process the states of the signal faces) for the traffic signal system. As the autonomous vehicle 200 approaches the intersection, the image processor 265 can continuously update the template and project the template onto the image data 262 to perform a probabilistic matching operation to determine the state (e.g., red, yellow, green) of each subset of the traffic signal system.

Additionally, the traffic signal analysis system 205 can receive the route data 232 from the AV control system 220 to determine a pass-through action for the intersection. The pass-through action can be a straight-through action, a left turn, a right turn, or a U-turn. In certain scenarios, such as complex intersections involving multiple straight-through options (e.g., a forked intersection), multiple left turn options, and the like, the route data 232 can indicate the precise pass-through action to be performed by the autonomous vehicle 200. Identifying the specified pass-through action, the image processor 265 can analyze the particular subset(s) corresponding to the pass-through action to dynamically determine the state of the traffic signal for that pass-through action, and generate an output 266 for the AV control system 220 indicating the state. Further detail regarding the traffic signal analysis system 205 is provided below with respect to FIGS. 3 and 4.

Autonomous Vehicle in Operation

Figure 3:
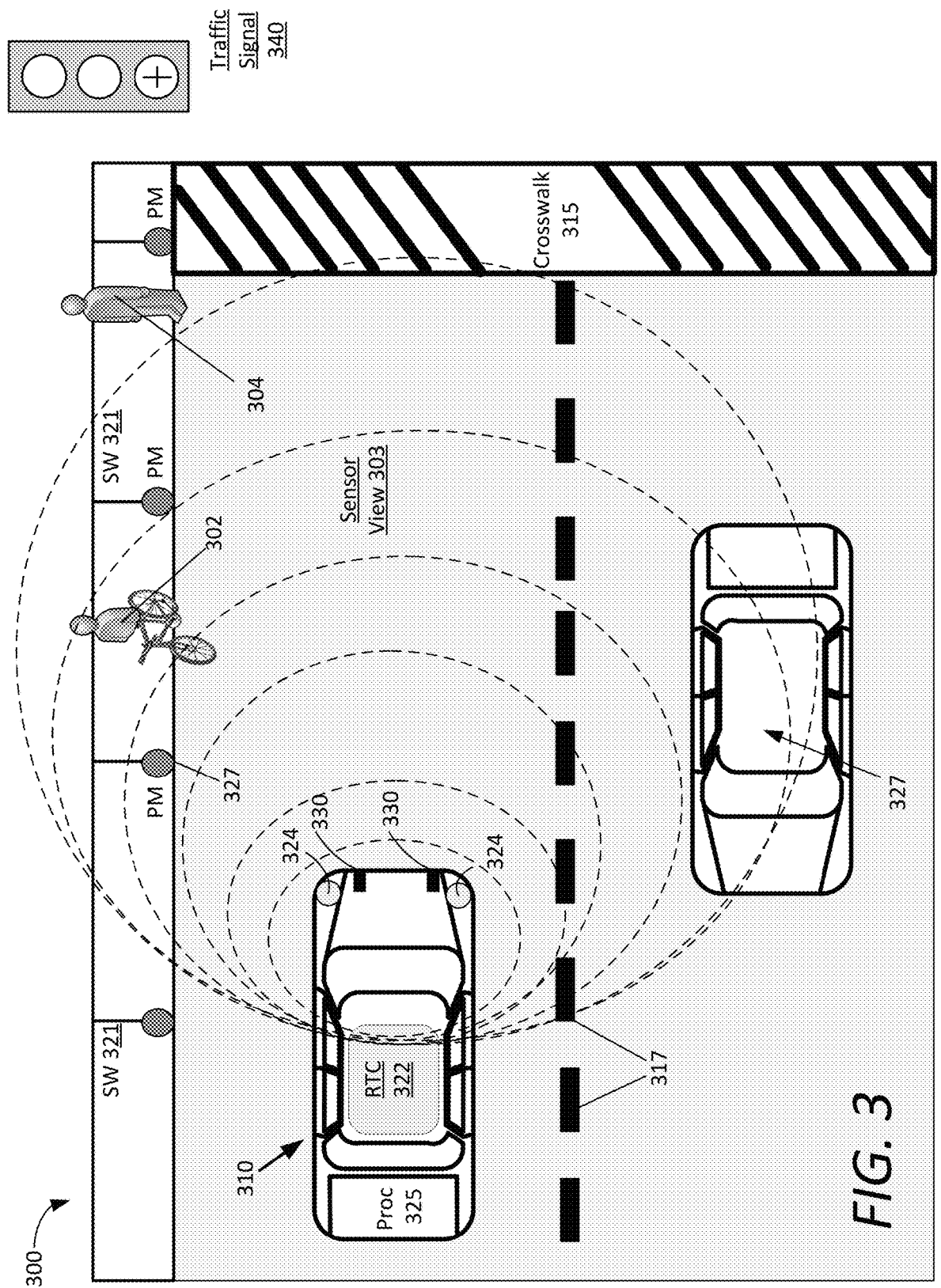
FIG. 3 shows an example of an autonomous vehicle utilizing sensor data to navigate an environment in accordance with example implementations.

FIG. 3 shows an example of an autonomous vehicle 310 utilizing sensor data to navigate an environment 300 in accordance with example implementations. In an example of FIG. 3, the autonomous vehicle 310 may include various sensors, such as a roof-top camera array (RTC) 322, front-facing cameras 324 and laser rangefinders 330. A data processing system 325, comprising a combination of one or more processors and memory units, can be positioned in a trunk of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data, corresponding to the sensor views 303 from one or more sensors in order to detect objects that are, or may potentially be, in the path of the vehicle 310. In an example shown, the detected objects include a bicyclist 302, a pedestrian 304, and another vehicle 327—each of which may potentially cross into a road segment 315 along which the vehicle 310 traverses. The vehicle 310 can use information about the road segment and/or image data from the sensor views 303 to determine that the road segment includes a divider 317 and an opposite lane, as well as a sidewalk (SW) 321 and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle may accurately detect the presence of objects in the environment 300, allowing the vehicle to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or driver far from curb), light or horn actions, and other actions. In some aspects, the avoidance action may run counter to certain driving conventions and/or rules (e.g., allowing the vehicle 310 to drive across center line to create space with bicyclist).

In an example, the data processing system 325 identifies static objects such as parking meters 327, and can accurately determine that the parking meters 327 are fixed objects (e.g., based on their relatively static or stable locations in the sensor views 303). Thus, the vehicle 310 may navigate around the parking meters 327 at higher speeds, since the parking meters 327 are unlikely to cross into the path of the oncoming vehicle 310. In contrast, without accurate timing of sensor data, the vehicle 310 could potentially detect the parking meters 327 as moving objects, for example, based on optical distortions or artifacts in the sensor views 303 and/or inconsistent distance information from multiple sensors (e.g., when attempting to combine sensor data taken at different times). This could cause the vehicle 310 to unnecessarily slow down or drive more cautiously when approaching the parking meters 327.

In another example, the vehicle 310 can accurately determine that the bicyclist 302 and pedestrian 304 are moving objects (e.g., based on changes to their locations in the sensor views 303). Thus, the vehicle 310 may slow down or drive more cautiously when approaching the bicyclist 302 and/or pedestrian 304.

According to examples described herein, the camera array 322 can include a dedicated traffic signal detection camera to specifically detect traffic signals 340 along a current route traveled. Additionally or alternatively, the traffic signal analysis component of the vehicle 310 can utilize other sensors (e.g., LIDAR, camera sensors, or stereo camera sensors) to detect traffic signals 340. Additionally or alternatively still, the signal analysis component can utilize current sub-maps stored in a memory resource of the autonomous vehicle 310 (or accessed remotely from a backend system) to identify the locations of forward traffic signals 340 along the current route. Once the traffic signal 340 is detected, the traffic signal analysis system can perform operations to dynamically determine and/or predict the state of the traffic signal for the pass-through action of the autonomous vehicle 310 as the vehicle approaches the intersection, as described below.

Traffic Signal Analysis System

Figure 4:
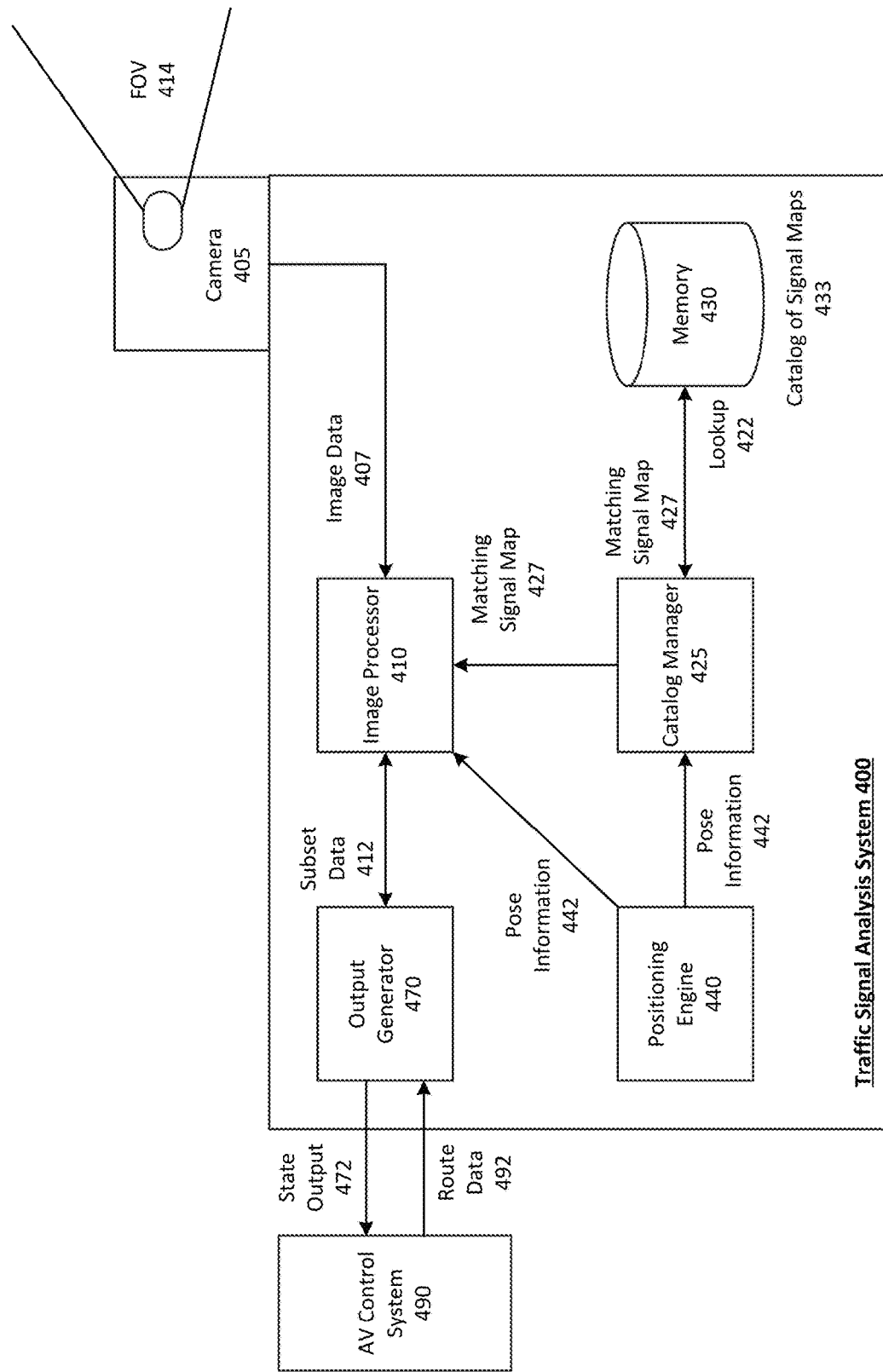
FIG. 4 is a block diagram illustrating an example traffic signal analysis system in accordance with example implementations.

FIG. 4 is a block diagram illustrating an example traffic signal analysis system 400 in accordance with example implementations. The traffic signal analysis system 400 can include a camera 405 having a field of view (FOV) 414 directed to capture image data 407 that includes traffic signaling systems along the current route of the autonomous vehicle. As described herein, the traffic signal analysis system 400 can be provided as a dedicated, independent module of the autonomous vehicle, as shown in FIG. 4, or can utilize data from other integrated components of the autonomous vehicle, such as described with respect to FIG. 2. The traffic signal analysis system 400 can include a memory 430 storing a catalog of signal maps 433 for any given region (e.g., a city, a state, the world). The catalog 433 can include signal maps for every direction of every intersection that the autonomous vehicle may encounter. Alternatively, the catalog of signal maps 433 can be stored remotely and accessed by the traffic signal analysis system 400 in real time.

In certain implementations, the each of the signal maps 433 can be pre-recorded and labeled to indicate the subsets for a particular traffic signaling system. For example, during a recording and labeling phase, vehicles including sensors (e.g., camera sensors), a positioning system, and a range finder can record data to locate traffic signals throughout the given region. The recorded data can be analyzed (e.g., by human analysts or algorithmically) to identify the traffic signal faces for a particular direction of an intersection, label the points of interest identifying the exact locations of the signal faces, determine the subsets for the traffic signal system, correlate the subsets to the lanes, and store each labeled map in a mapping log. In one example, the sensor and processing systems of the recording vehicles can process and upload the image data to a backend system, which can run labeling operations to generate the signal maps 433. In one example, after the signal maps 433 are generated and verified, the backend system can provide the signal maps 433 to autonomous vehicles traveling throughout the given region in which the signal maps 433 were recorded.

As the autonomous vehicle travels along a current route, a positioning engine 440 of the signal analysis system 400 can determine the pose (i.e., position and orientation) of the autonomous vehicle. In some aspects, the pose information 442 can be provided to a catalog manager 425 of the signal analysis system 400, which can utilize the pose information 442 to perform a lookup 422 in the memory 430 for a matching signal map 427 corresponding to an approaching intersection. The matching signal map 427 can include detailed information regarding the characteristics and properties of the upcoming traffic signal, including region of interest information that indicates the precise locations of the signal faces in the image data 407. In many examples, the matching signal map 427 can be pre-labeled (e.g., in the metadata of the matching signal map 427) with subset data indicating the lights that correspond to individual pass-through actions. In some variations, the traffic signal analysis system 400 can perform a probabilistic state matching operation dynamically, as the autonomous vehicle approaches the traffic signal system, to determine the state of the traffic signaling system for each pass-through action (e.g., left turn, right turn, straight through action) in real time.

The image processor 410 can monitor and analyze the image data 407 recorded by the camera 405 to ultimately identify traffic signals. In one aspect, the image processor 410 can analyze region of interest information in the matching signal map 427 to generate and project signal templates, for the regions of interest (e.g., block regions), onto the image data 407 to determine the state of a specified traffic signal for a specified pass-through action. In variations, the regions of interest can be dynamically generated by the traffic signal analysis system 400 based on data stored on the matching signal map 427. For example, the matching signal map 427 can indicate a relative location of an upcoming traffic signal, and based on pose information 442, the image processor 410 can dynamically generate regions of interest on the image data 407 based on the relative locations indicated in the matching signal map 427. The regions of interest can define the locations in the image data 407 where the image processor 410 is expected to identify the individual signal faces. Additionally, the generated templates can enable the image processor 410 to focus specifically on the regions of interest in the image data 407 to analyze the signal faces and make probabilistic determinations for the states of the subsets that include those signal faces. In some aspects, the matching signal map 427 can indicate the nature of each signal face (e.g., the number of signal bulbs, the locations of signal bulbs, the size and locations of the faces themselves, the subset(s) for the signal faces, the lane(s) associated with the subset(s), and the like). Accordingly, the image processor 410 can identify the signal faces, identify the subsets for the traffic signaling system, and ultimately determine the state of a specified subset or multiple subsets for the autonomous vehicle.

In certain implementations, the image processor 410 can provide subset data 412 to an output generator 470 of the traffic signal analysis system 400. The subset data 412 can include the state of a specified subset or multiple subsets of the traffic signaling system. In some examples, the output generator 470 can be communicatively coupled to autonomous vehicle components, such as the AV control system 490—which operates the acceleration, braking, and steering systems of the autonomous vehicle. The output generator 470 can receive route data 492 from the AV control system 490 to determine a pass-through action for the autonomous vehicle through the intersection. Utilizing the subset data 412, the output generator 470 can analyze the specified subset(s) corresponding to the pass-through action. Based on the state of the traffic signaling system for the pass-through action, the output generator 470 can generate a state output 472 indicating the signal state for the pass-through action, and transmit the state output 472 to the AV control system 490. The AV control system 490 can utilize the state output 472 to, for example, brake (e.g., for a red or yellow state), adjust or maintain speed (e.g., for a right-of-way green state), or yield (e.g., for yielding green states or right turns on red).

The generated state output 472 can indicate the state of the traffic signaling system for the pass-through action. In some examples, the state output 472 can include a command instructing the AV control system 490 to stop at the intersection. Additionally or alternatively, the generated output 472 can include an indication that the autonomous vehicle has a right-of-way through the intersection for the pass-through action. In further variations, the state output 472 can include an indication to the AV control system 490 to yield to vehicles having right-of-way, or to pedestrians, before passing through the intersection. In accordance with examples described herein, upon approaching an intersection, the traffic signal analysis system 400 and the AV control system 490 can resolve any potential events based on the traffic signal state for a particular pass-through action. For example, in complex intersections, the output generator 470 can identify the precise pass-through action to be performed by the autonomous vehicle, and focus its analysis on the subset(s) for that pass-through action. In some examples, the state output 472 can be dynamically generated for the AV control system 490 so that the AV control system 490 can monitor the state output 472 (indicating the subset state for the pass-through action) dynamically. In such examples, the AV control system 490 can readily respond to any changes in the state of the traffic signal, and can proceed with high caution during yielding operations.

Figure 5:
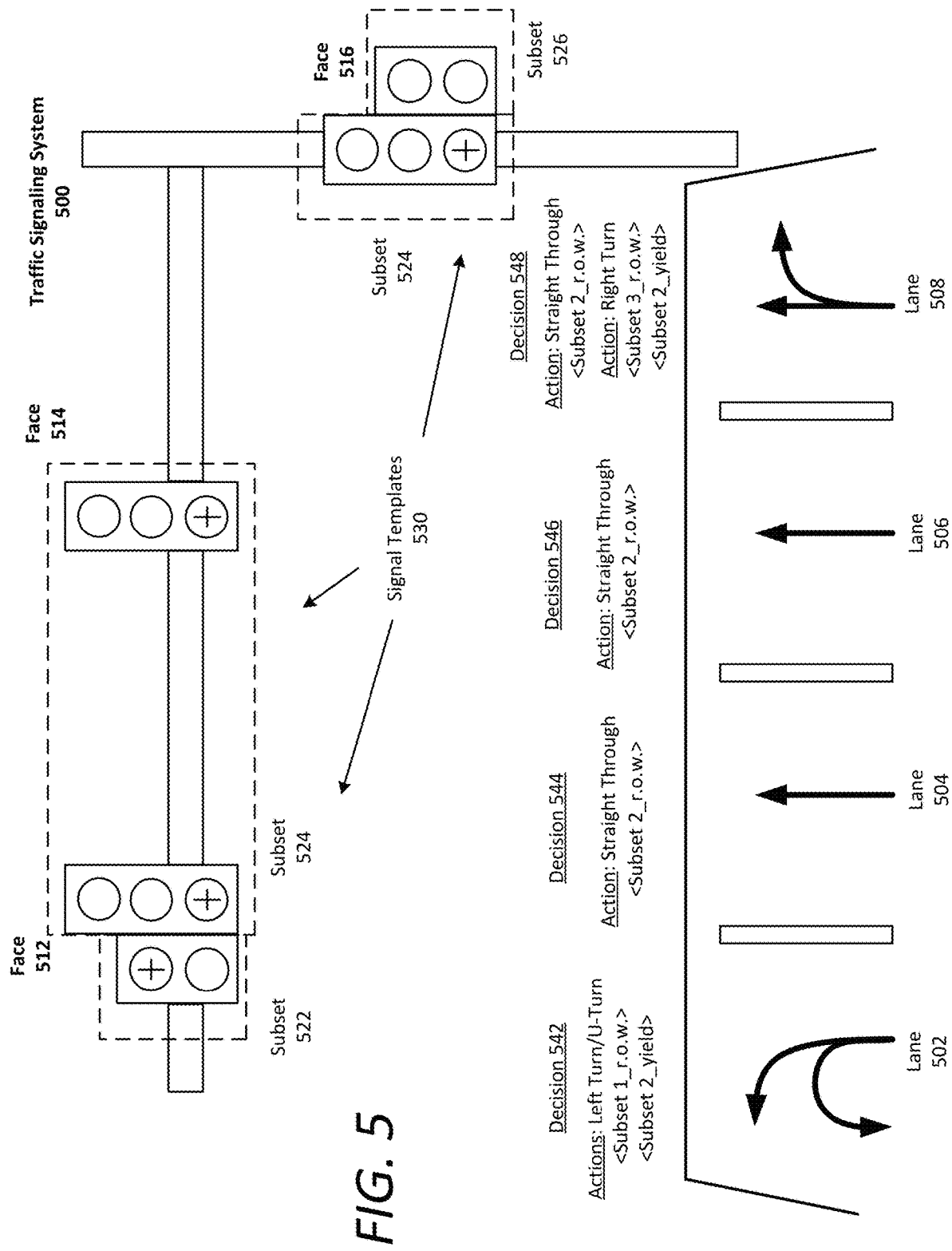
FIG. 5 shows an example intersection including an example traffic signaling system being analyzed by a traffic signal analysis system of an autonomous vehicle, according to examples described herein.

FIG. 5 shows an example intersection including an example traffic signaling system being analyzed by a traffic signal analysis system of an autonomous vehicle, according to examples described herein. In the below description of FIG. 5, reference may be made to reference characters representing various features described with respect to FIG. 4 for illustrative purposes. Referring to FIG. 5, the traffic signal analysis system 400 can identify the traffic signaling system 500 as the autonomous vehicle approaches the intersection. For example, the signal analysis system 400 can be enabled to identify the traffic signal system 500 from a given distance away (e.g., 100 meters), which can also be velocity dependent (e.g., enabling distance (meters)=stopping distance at current velocity for a desired deceleration rate). As an example, at 50 mph, the distance from a particular traffic signal at which the signal analysis system 400 is enabled can be 250 meters. In such examples, the distance to a particular traffic signal can be identified by the autonomous vehicle's on-board data processing system, which can utilize data sub-maps that indicate the locations of intersections. When a threshold distance (or velocity dependent distance) is reached, the data processing system can enable the signal analysis system 400 automatically. In variations, the traffic signal analysis system 400 can continuously operate to receive and monitor the image data 407 for traffic signals.

In many aspects, the signal analysis system 400 can project signal templates 530 onto the image data 407 that indicate the regions of interest to analyze for the traffic signal faces 512, 514, 516. In the example shown in FIG. 5, the traffic signaling system 500 includes three signal faces (Face 512, Face 514, and Face 516). The signal analysis system 400 can determine a pass-through action to be performed by the autonomous vehicle, and/or can identify a lane in which the autonomous vehicle travels or will travel when crossing the intersection. The pass-through action can be identified by the signal analysis system 400 in the route data 492 provided by the AV control system 490 or a mapping resource. Additionally, the projected template 530 can be dynamically generated by the signal analysis system 400 as the autonomous vehicle approaches the intersection.

Accordingly, the signal analysis system 400 can resize and relocate the signal templates 530 on the image data 407.

According to examples described herein, the signal analysis system 400 can identify the signal templates 530 and/or signal subsets 522, 524, 526 corresponding to the pass-through action to be performed by the autonomous vehicle. For example, the route data 492 can indicate that the autonomous vehicle will pass straight through the intersection. The signal analysis system 400 can then determine that subset 524 of the traffic signal system 500 corresponds to the "straight-through" action, and therefore monitor and/or analyze subset 524 accordingly. In the example shown, subset 524 indicates a green light state as the autonomous vehicle approaches the intersection. In order to identify the green light state, the signal analysis system 400 can perform an image processing operation for subset 524 on each of face 512, face 514, and face 516 to determine whether each individual signal (i.e., each of the bulbs) of subset 524 on each face 512, 514, 516 is in an "on" or "off" state. Thus, if one or more of the faces 512, 514, 516 were occluded, the signal analysis system 400 can bypass the occluded signal face to ultimately determine the state of the traffic signaling system 500 for the "straight-through" action.

Additionally or alternatively, the signal analysis system 400 can identify the lane on which the autonomous vehicle is traveling, or on which the autonomous vehicle will travel through the intersection. In the example shown in FIG. 5, the road includes four separate lanes 502, 504, 506, 508. Each of the lanes 502, 504, 506, 508 corresponds to a set of possible decisions 542, 544, 546, 548, which can be indicated in the matching signal map 427 (e.g., in metadata) or determined by the signal analysis system 400 dynamically. Thus, depending on the lane, the signal analysis system 400 can filter out certain possible pass-through actions. For example, if the autonomous vehicle is to pass through the intersection in lanes 504 or 506, the signal analysis system 400 can filter out left turn, right turn, and U-turn pass-through actions, and thus only monitor subset 524 to identify the state of the traffic signaling system 500 for the straight-through action, as shown in FIG. 5.

As another example, if the autonomous vehicle is to enter the intersection in lane 502, then the signal analysis system 400 can filter out straight-through and right turn actions, and thus monitor primarily subset 522 on face 512 to determine whether the autonomous vehicle has right-of-way to perform the left turn or U-turn action. In the example shown, the signal analysis system 400 can further identify that the left turn and U-turn actions depend secondarily on subset 524 (i.e., the red light state). Accordingly, when determining the state for the left turn and U-turn actions, the signal analysis system 400 can further monitor subset 524 to ultimately determine whether the autonomous vehicle can perform the left turn or U-turn action through the intersection. Specifically, during the image processing operation, the signal analysis system 400 can first identify subset 522 as being the primary, "right-of-way" signal that indicates whether the autonomous vehicle may simply pass-through the intersection (e.g., in the green light state on subset 522). If the image processing operation results in no state threshold being met for subset 522 (e.g., both yellow and green lights are deasserted), the signal analysis system 400 may then secondarily monitor subset 524 to determine whether the autonomous vehicle is permitted to perform the pass-through action in lane 502, but with a yield condition. In the example shown in FIG. 5, subset 522 is in the yellow state. In conjunction, the signal analysis system 400 can run an image processing operation on subset 524 with a match threshold being met for the green light state (as shown). Accordingly, the combined results of the image processing operations for subset 522 and subset 524 can indicate to the AV control system 490 that the right-of-way condition is in the yellow state, and that the yield condition is in the green state, and the AV control system 490 can either pass-through the intersection with right-of-way based on the yellow state of subset 522 (e.g., if adequate time is available), or yield to oncoming vehicles (i.e., right-of-way vehicles) based on subset 524 being in the green state. When subset 524 is in the red state, the signal analysis system 400 can indicate to the AV control system 490 to stop at the intersection.

Examples described herein recognize that the signal analysis system 400 can analyze a primary subset (e.g., a right-of-way subset) and a secondary subset (e.g., a yield subset), and in some circumstances a tertiary subset (e.g., for conditional traffic signals in complex intersections), applicable to the pass-through action—which may be determined using the route data 492 and/or the current lane traveled by the autonomous vehicle. In many examples, the decisions 542, 544, 546, 548 and lane associations for traffic signaling system 400 can be pre-labeled on the matching signal map 427 for the directional aspect (e.g., eastbound) of the intersection to aid the signal analysis system 400 in identifying the applicable subset(s), filtering out the inapplicable subset (s), and determining the instant condition(s) for the pass-through action. Accordingly, the signal analysis system 400 can identify the pass-through action of the autonomous vehicle using the route data 492 and/or the current lane, and consult the matching signal map 427 to determine the applicable subsets of the traffic signaling system 500 that correspond to the pass-through action. Additionally, the matching signal map 427 can further indicate the decisions 542, 544, 546, 548 that may be made in each lane, and the right-of-way and yield dependencies correlated to respective subsets.

For the particular situation in which the autonomous vehicle is to turn right at the intersection, the signal analysis system 400 can look up the matching signal map 427 to identify the applicable subsets (e.g., subset 526 for right-of-way and subset 524 for yield). The signal analysis system 400 can monitor subset 526 to determine whether the autonomous vehicle has right-of-way for the right turn. In monitoring subset 526, the signal analysis system 400 can perform a continuous image processing operation for each state (i.e., the yellow state and the green state) of subset 526 to determine whether either possible state exceeds a predetermined match threshold. In some examples, the image processing operation can comprise a calculation based on a detected brightness from each bulb of subset 526 to determine whether the detected brightness exceeds a brightness threshold, indicating that the bulb is asserted.

In the example shown, both yellow and green states are deasserted or off, and thus the signal analysis system 400 can generate the output 472 for subset 526 indicating that right-of-way for the right turn action is not permitted. At the same time, the signal analysis system 400 can monitor subset 524 to determine whether the autonomous vehicle includes a yield option. Embodiments herein recognize that there may be multiple yield options (e.g., yield to right-of-way vehicles, yield to bicyclists, yield to pedestrians, etc.). In the example shown in FIG. 5, the image processing operation can indicate that a matching threshold for the green state in subset 524 has been exceeded (e.g., a brightness of the green bulb exceeds a brightness threshold, indicating that the green light is asserted). Consequently, the signal analysis system 400 can determine that the autonomous vehicle may proceed with the right turn action while yielding to pedestrians, for example, in accordance with decision rules indicated in the metadata of the matching signal map 427. As another example, if subset 524 were in the red state, the signal analysis system 400 could determine that the autonomous vehicle may proceed with the right turn action after coming to a stop while yielding to right-of-way vehicles (unless otherwise indicated by, for example, a "no turn on red" sign). Accordingly, in one example, the signal analysis system 400 can monitor the intersection, using the camera 405, for any limiting signs that place a qualifier on a particular action (e.g., "no turn on red" limiting sign for right-turn actions). In variations, the limiting signs and/or qualifiers may be integrated in, for example, metadata of the matching signal map 427 during pre-labeling and verification.

In certain implementations, the matching signal map 427 can also indicate timing characteristics of the traffic signaling system 500. For example, the timing characteristics can indicate how long a particular light on a particular subset will remain in a yellow state (or a red state or green state). The signal analysis system 400 can utilize the timing characteristics to predict an estimated state for the pass-through action when the autonomous vehicle reaches the intersection. Additionally or alternatively, the state output 472 generated by the signal analysis system 400 can indicate to the AV control system 490 a timing feature (e.g., a countdown) to when the state for the pass-through action will change to a different state. In response, the AV control system 490 can adjust the speed of the autonomous vehicle as it approaches the intersection.

Figure 6:
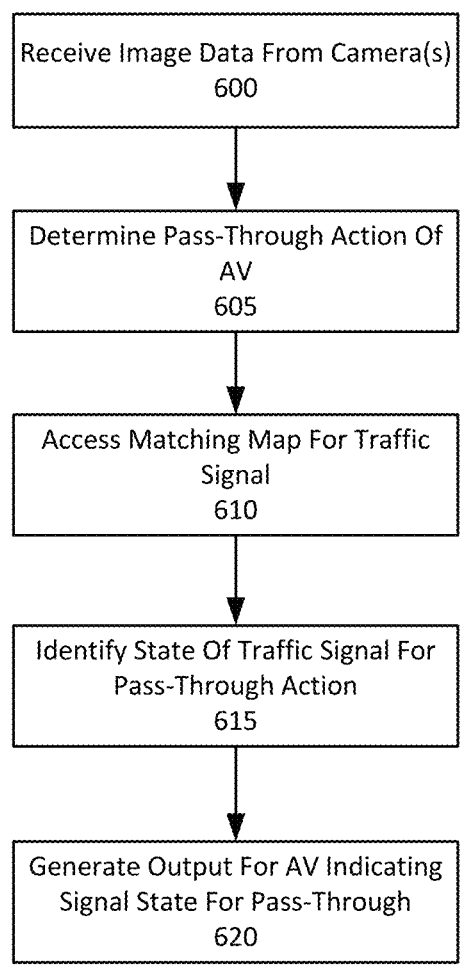
FIG. 6 is a high-level flow chart describing an example method of analyzing a traffic signal system in accordance with example implementations.

FIG. 6 is a high level flow chart describing an example method of analyzing a traffic signal system in accordance with example implementations. In the example method described with respect to FIG. 6, reference may be made to like reference characters representing various features of FIGS. 4 and 5 for illustrative purposes. Furthermore, the method described with respect to FIG. 6 may be performed by an example traffic signal analysis system 205, 400 shown and described with respect to FIGS. 2 and 4. Still further, the steps shown in the blocks of FIG. 6 need not be performed in the sequence shown, but rather the steps may be performed in any order or performed concurrently. Referring to FIG. 6, the signal analysis system 400 can receive image data 407 from a forward facing camera of the AV (600). In some examples, the image data 407 can be received or recorded by one or more sensors of the autonomous vehicle (e.g., a camera or stereo camera sensor). In variations, the signal analysis system 400 can include a dedicated camera 405 that records the image data 407.

In many examples, the signal analysis system 400 can determine a pass-through action for the autonomous vehicle through an upcoming intersection (605). As described herein, the pass-through action can be determined based on route data 492 and/or a current lane in which the autonomous vehicle travels. The pass-through action can include a right turn, left turn, U-turn, straight-through action, and the like. The signal analysis system 400 can access a matching signal map 427 for the traffic signaling system 500 (610), and identify the state of the traffic signaling system 500 for the pass-through action (615). Accordingly, the signal analysis system 400 can generate a state output 472 for the AV control system 490 indicating the state for the pass-through action (620).

Figure 7:
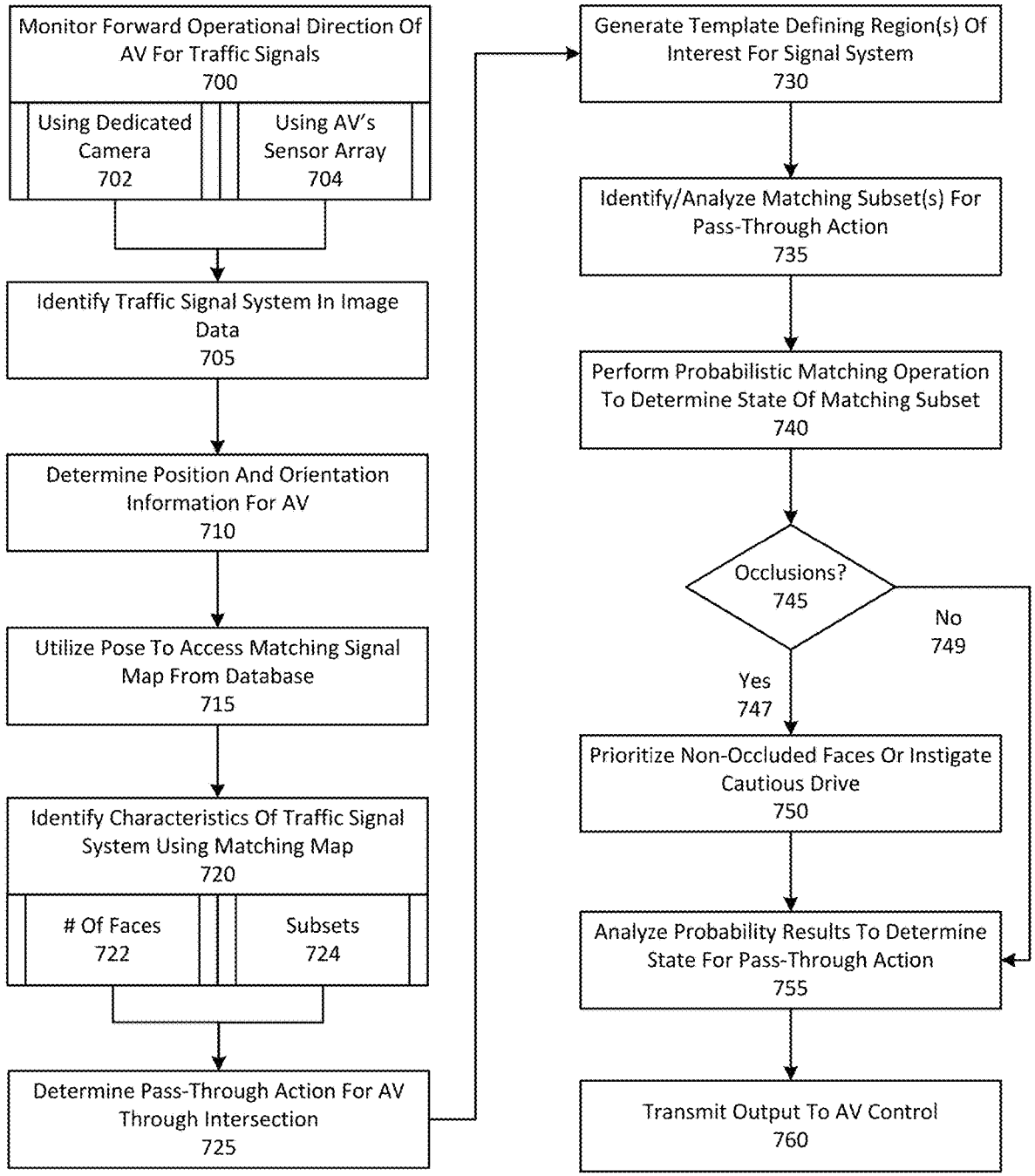
FIG. 7 is a low-level flow chart describing an example method of analyzing a traffic signal system in accordance with example implementations.

FIG. 7 is a low level flow chart describing an example method of analyzing a traffic signal system in accordance with example implementations. In the example method described with respect to FIG. 7, reference may again be made to like reference characters representing various features of FIGS. 4 and 5 for illustrative purposes. Furthermore, the method described with respect to FIG. 7 may be performed by an example traffic signal analysis system 205, 400 shown and described with respect to FIGS. 2 and 4. Still further, the steps shown in the blocks of FIG. 7 need not be performed in the sequence shown, but rather the steps may be performed in any order or performed concurrently. Referring to FIG. 7, the signal analysis system 400 can monitor a forward operations direction of the autonomous vehicle for traffic signals (700). As described, the signal analysis system 400 can utilize a dedicated camera 405 (702) or sensors of the autonomous vehicle's sensor array (704).

The signal analysis system 400 can identify a traffic signaling system 500 in the image data 407 (705), determine a position and orientation of the autonomous vehicle (i.e., pose information) (710), and utilize the pose information to access a matching signal map 427 from a database (715). In some examples, the database is located in the memory resources of the signal analysis system 400 or autonomous vehicle itself. In variations, the database of signal maps can be located on a backend system and accessed by the signal analysis system 400 in real time via a network. The signal analysis system 400 can identify the characteristics of the traffic signaling system 500 using the matching signal map 427 (720), which can indicate the number of signal faces (722), and identify the subsets for each pass-through action (724).

In many aspects, the signal analysis system 400 can determine a pass-through action for the autonomous vehicle through the intersection (725), and generate a template defining the region(s) of interest for the signal faces corresponding to the pass-through action (730). For example, if the autonomous vehicle is to travel straight through the intersection, the signal analysis system 400 can utilize the matching signal map to identify the signal faces and subsets for the straight through action, and generate and project a template onto the image data 407 identifying the region(s) of interest for analysis by the image processor 410 of the signal analysis system 400. Accordingly, the signal analysis system 400 can identify and analyze the matching subset(s) for the pass-through action (735) as the autonomous vehicle approaches the traffic signaling system 500. In some aspects, at (740), the signal analysis system 400 can perform a probabilistic matching operation or other image processing operation for each possible state (e.g., red, yellow, and green) for each matching subset to determine an overall state for the pass-through action (e.g., green state right-of-way, green state yield, red state, etc.).

For certain implementations, the signal analysis system 400 can determine whether there are any occlusions (745) on any signal faces. If an occlusions exists (747) (e.g., a truck blocking a signal face), the signal analysis system 400 can prioritize non-occluded faces (750)—or if none exist, instigate a high caution driving mode to identify the signal state once the occlusion passes (750)—and analyze the results of the probabilistic matching operation to determine the state for the pass-through action (755). If there are no occlusions (749), then the signal analysis system 400 can directly analyze the results of the probabilistic matching operation to determine the state for the pass-through action (755). Accordingly, when a clear matching threshold is met (e.g., a brightness threshold) for a particular state (e.g., a green light state), the signal analysis system 400 can generate and transmit a state output 472 to the AV control system 490 (760). In many examples, the probabilistic matching operation is performed dynamically as the autonomous vehicle approaches the intersection. Accordingly, the state output 472 may also be generated dynamically. Furthermore, in some aspects, the generated output 472 can further provide a prediction of when the state for the pass-through action will change. The prediction can be based on timing characteristics of the traffic signaling system 500 indicated in the matching signal map 427.

Hardware Diagram

Figure 8:
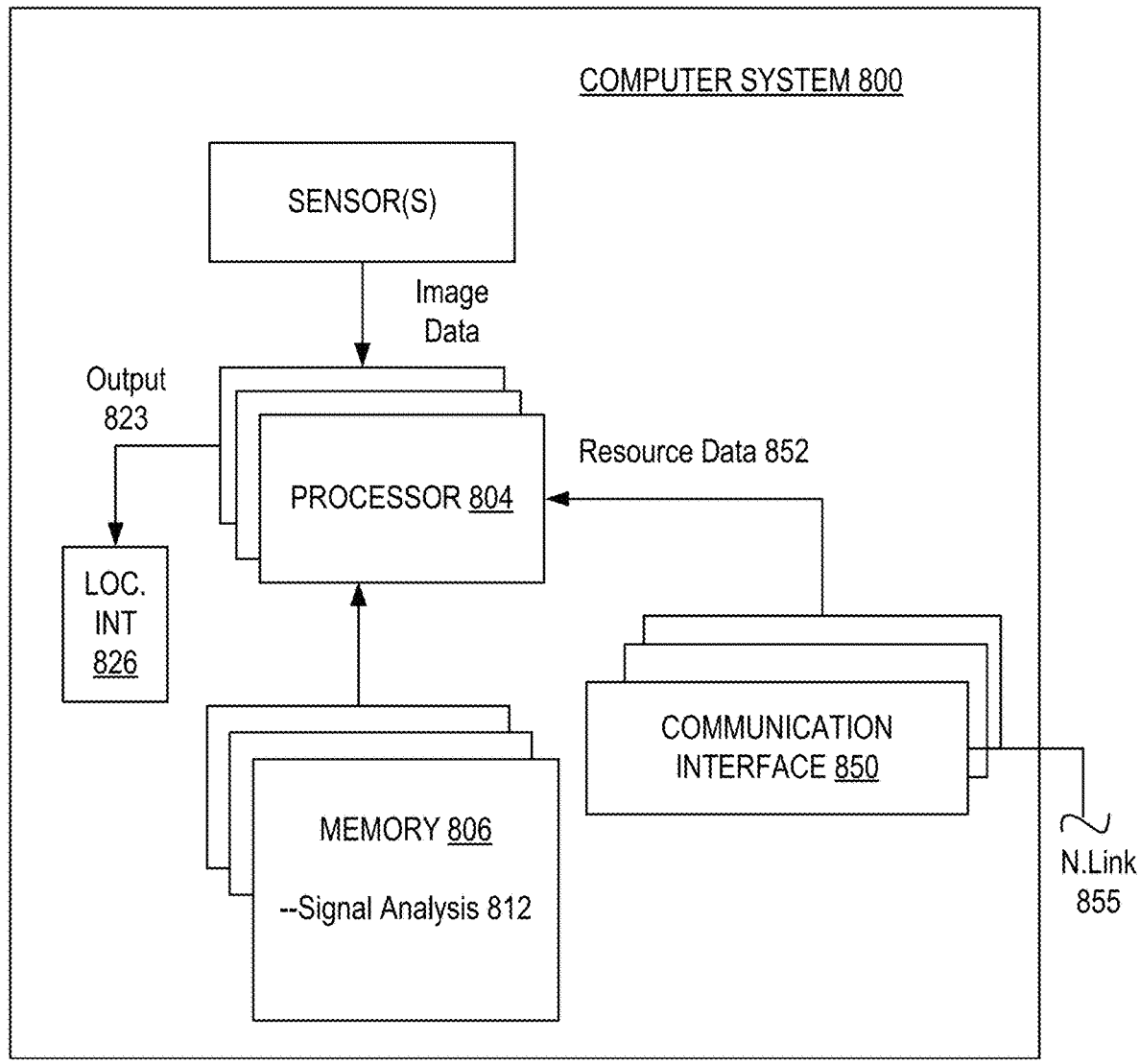
FIG. 8 is a block diagram illustrating an example computer system upon which examples described herein may be implemented.

FIG. 8 shows a block diagram of a computer system on which examples described herein may be implemented. For example, the traffic signal analysis system 205, 400 shown and described with respect to FIGS. 2 and 4 may be implemented on the computer system 800 of FIG. 8. The computer system 800 can be implemented using one or more processors 804, and one or more memory resources 806. In the context of FIG. 4, the traffic signal analysis system 400 can be implemented using one or more components of the computer system 800 shown in FIG. 8.

According to some examples, the computer system 800 may be implemented within an autonomous vehicle with software and hardware resources such as described with examples of FIGS. 1, 2, and 4. In an example shown, the computer system 800 can be distributed spatially into various regions of the autonomous vehicle, with various aspects integrated with other components of the autonomous vehicle itself. For example, the processors 804 and/or memory resources 806 can be provided in the trunk of the autonomous vehicle. The various processing resources 804 of the computer system 800 can also execute signal analysis instructions 812 using microprocessors or integrated circuits. In some examples, the signal analysis instructions 812 can be executed by the processing resources 804 using field-programmable gate arrays (FPGAs).

In an example of FIG. 8, the computer system 800 can include a local communication interface 826 (or series of local links) to vehicle interfaces and other resources of the autonomous vehicle. In one implementation, the local communication interface 826 provides a data bus or other local links to electro-mechanical interfaces of the vehicle, such as wireless or wired links to the AV control system 490 to transmit or stream the generated output 823 indicating the signal state for a pass-through action.

The memory resources 806 can include, for example, main memory, a read-only memory (ROM), storage device, and cache resources. The main memory of memory resources 806 can include random access memory (RAM) or other dynamic storage device, for storing information and instructions which are executable by the processors 804. The processors 804 can execute instructions for processing information stored with the main memory of the memory resources 806. The main memory 806 can also store temporary variables or other intermediate information which can be used during execution of instructions by one or more of the processors 804. The memory resources 806 can also include ROM or other static storage device for storing static information and instructions for one or more of the processors 804. The memory resources 806 can also include other forms of memory devices and components, such as a magnetic disk or optical disk, for purpose of storing information and instructions for use by one or more of the processors 804.

According to some examples, the memory 806 may store a plurality of software instructions including, for example, signal analysis instructions 812. During runtime (e.g., when the vehicle is operational), the signal analysis instructions 812 may be executed by one or more of the processors 804 in order to implement functionality such as described with respect to the traffic signal analysis system 205, 400 of FIGS. 2 and 4.

In certain examples, the computer system can also include a communication interface 850 to communicate with external resources (e.g., a backend system) over a network link 855. For example, in executing the signal analysis instructions 812, the processing resources 804 can retrieve, via the communication interface 850 over the network link 855, resource data 852 such as signal maps that identify the characteristics and properties of an upcoming traffic signaling system. The processing resources 804 can utilize such resource data 852 to further aid in determine the signal state of the traffic signaling system for a particular pass-through action.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A traffic signal analysis system for an autonomous vehicle (AV), the traffic signal analysis system comprising:
   one or more processors; and
   one or more memory resources storing instructions that, when executed by the one or more processors, cause the one or more processors to:
   receive image data from one or more cameras, the image data including an upcoming traffic signaling system located at an intersection;
   determine an action for the AV through the intersection;
   access a matching signal map specific to the upcoming traffic signaling system;
   using the matching signal map, (i) generate a signal template for the upcoming traffic signaling system, the signal template defining at least one region of interest that comprises a plurality of traffic signal faces of the upcoming traffic signaling system, and (ii) determine a first subset and a second subset of the plurality of traffic signal faces that apply to the action;
   dynamically analyze the first subset and the second subset to determine a state of the upcoming traffic signaling system for the action; and
   generate an output for the AV indicating the state of the upcoming traffic signaling system for the action.

2. The traffic signal analysis system of claim 1, wherein the executed instructions cause the one or more processors to dynamically analyze the first and second subsets by performing a matching operation for one or more portions of the at least one region of interest to determine a state of the first and second subsets for each traffic signal face in the first and second subsets.

3. The traffic signal analysis system of claim 2, wherein the first and second subsets comprise more than one of the traffic signal faces that apply to the action, and wherein the executed instructions further cause the one or more processors to:

when one of the traffic signal faces is at least partially occluded, prioritize a remainder of the other traffic signal faces in the first and second subsets, during the matching operation, to determine the state of the upcoming traffic signaling system for the action.

4. The traffic signal analysis system of claim 1, wherein the executed instructions further cause the one or more processors to:

determine a plurality of pass-through options for the plurality of traffic signal faces;

wherein the generated signal template comprises a signal subset for each of the plurality of pass-through options.

5. The traffic signal analysis system of claim 4, wherein the plurality of pass-through options comprises two or more of a left turn option, a right turn option, a U-turn option, or a straight-through option.

6. The traffic signal analysis system of claim 1, wherein the one or more cameras comprise a dedicated signal camera specific for identifying traffic signals.

7. The traffic signal analysis system of claim 6, wherein the dedicated signal camera comprises a set of camera settings configured to detect traffic signals, the set of camera settings being different from camera settings of a set of perception cameras utilized by a control system of the AV.

8. The traffic signal analysis system of claim 1, wherein the generated output for the AV, indicating the state of the upcoming traffic signaling system for the action, comprises either (i) a command instructing a control system of the AV to stop at the intersection, (ii) an indication to the control system that the AV has a right-of-way through the intersection, or (iii) an indication to the control system to yield to right-of-way vehicles before passing through the intersection.

9. The traffic signal analysis system of claim 1, wherein the executed instructions further cause the one or more processors to:

predict the state of the upcoming traffic signaling system for the action when the AV arrives at the intersection;

wherein the generated output comprises the predicted state of the upcoming traffic signaling system for the action.

10. An autonomous vehicle (AV) comprising:
a sensor system to dynamically generate sensor data indicating a situational environment of the AV;
acceleration, braking, and steering systems; and
a control system comprising one or more processing resources executing instructions that cause the control system to:
process the sensor data to autonomously operate the acceleration, braking, and steeling systems of the AV;
receive image data from one or more cameras, the image data including an upcoming traffic signaling system located at an intersection;
determine an action for the AV through the intersection;
access a matching signal map specific to the upcoming traffic signaling system;
using the matching signal map, (i) generate a signal template for the upcoming traffic signaling system, the signal template defining at least one region of interest that comprises a plurality of traffic signal faces of the upcoming traffic signaling system, and (ii) determine a first subset and a second subset of the plurality of traffic signal faces that apply to the action;

dynamically analyze the first subset and the second subset to determine a state of the upcoming traffic signaling system for the action; and execute a corresponding action using the acceleration, braking, and steering systems based on the state of the upcoming traffic signaling system for the action.

11. The AV of claim 10, wherein the executed instructions cause the control system to analyze the first and second subsets by performing a matching operation for one or more portions of the at least one region of interest to determine a state of the first and second subsets for each traffic signal face in the first and second subsets.

12. The AV of claim 11, wherein the first and second subsets comprise more than one of the traffic signal faces that apply to the action, and wherein the executed instructions further cause the control system to:

when one of the traffic signal faces is at least partially occluded, prioritize a remainder of the other traffic signal faces in the first and second subsets, during the matching operation, to determine the state of the upcoming traffic signaling system for the action.

13. The AV of claim 10, wherein the at least one region of interest comprises more than one of the traffic signal faces, and wherein the executed instructions further cause the control system to:

determine a plurality of pass-through options for the traffic signal faces of the at least one region of interest;

wherein the generated signal template comprises a signal subset for each of the plurality of pass-through options.

14. The AV of claim 13, wherein the plurality of pass-through options comprises two or more of a left turn option, a right turn option, a U-turn option, or a straight-through option.

15. The AV of claim 10, wherein the one or more cameras comprise a dedicated signal camera specific for identifying traffic signals.

16. The AV of claim 15, wherein the dedicated signal camera comprises a set of camera settings configured to detect traffic signals, the set of camera settings being different from camera settings of a set of perception cameras of the sensor system.

17. A non-transitory computer readable medium storing instructions that, when executed by one or more processors of an autonomous vehicle (AV), cause the one or more processors to:

receive image data from one or more cameras, the image data including an upcoming traffic signaling system located at an intersection;

determine an action for the AV through the intersection;

access a matching signal map specific to the upcoming traffic signaling system;

using the matching signal map, (i) generate a signal template for the upcoming traffic signaling system, the signal template defining at least one region of interest that comprises a plurality of traffic signal faces of the upcoming traffic signaling system, and (ii) determine a first subset and a second subset of the plurality of traffic signal faces that apply to the action;

dynamically analyze the first subset and the second subset to determine a state of the upcoming traffic signaling system for the action; and generate an output for the AV indicating the state of the upcoming traffic signaling system for the action.

18. The non-transitory computer readable medium of claim 17, wherein the executed instructions cause the one or more processors to dynamically analyze the first and second subsets by performing a matching operation for one or more portions of the at least one region of interest to determine a state of the first and second subsets for each traffic signal face in the first and second subsets.

19. The non-transitory computer readable medium of claim 18, wherein the first and second subsets comprise more than one of the traffic signal faces that apply to the action, and wherein the executed instructions further cause the one or more processors to:
when one of the traffic signal faces is at least partially occluded, prioritize a remainder of the other traffic signal faces in the first and second subsets, during the matching operation, to determine the state of the upcoming traffic signaling system for the action.

20. The non-transitory computer readable medium of claim 17, wherein the executed instructions further cause the one or more processors to:
determine a plurality of pass-through options for the plurality of traffic signal faces;
wherein the generated signal template comprises a signal subset for each of the plurality of pass-through options.

* * * * *